United States Patent
Gil et al.

(10) Patent No.: US 7,905,324 B2
(45) Date of Patent: Mar. 15, 2011

(54) ACCESS SYSTEM FOR A MOVEABLE VEHICLE

(75) Inventors: Jesus Manuel Gonzales Gil, Charleroi (BE); Eric Fannes, Braine L'Alleud (BE); Eric Flahaut, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 1687 days.

(21) Appl. No.: 11/139,606

(22) Filed: May 31, 2005

(65) Prior Publication Data

US 2006/0011416 A1 Jan. 19, 2006

Related U.S. Application Data

(60) Provisional application No. 60/587,879, filed on Jul. 15, 2004.

(51) Int. Cl.
*E06C 5/00* (2006.01)
(52) U.S. Cl. .................................. 182/127; 280/166
(58) Field of Classification Search ................ 182/127, 182/97; 280/166
See application file for complete search history.

(56) References Cited

U.S. PATENT DOCUMENTS

| | | | |
|---|---|---|---|
| 431,307 A | | 7/1890 | Wood et al. |
| 1,449,031 A | * | 3/1923 | Blake ............................ 105/445 |
| 2,125,085 A | * | 7/1938 | Pool .............................. 280/166 |
| 3,083,785 A | * | 4/1963 | Hyman ........................... 182/89 |
| 3,869,022 A | * | 3/1975 | Wallk ............................. 182/96 |
| 4,073,502 A | | 2/1978 | Frank et al. |
| 4,185,849 A | | 1/1980 | Jaeger |
| 4,231,583 A | | 11/1980 | Learn |
| 4,480,710 A | * | 11/1984 | Hansen .......................... 180/68.5 |
| 5,547,040 A | | 8/1996 | Hanser et al. |
| 5,988,316 A | | 11/1999 | Hedley |
| 6,178,364 B1 | | 1/2001 | Delurey et al. |
| 6,264,222 B1 | | 7/2001 | Johnston et al. |
| 2004/0173406 A1 | * | 9/2004 | Lantz ............................. 182/113 |

FOREIGN PATENT DOCUMENTS

| | | |
|---|---|---|
| FR | 2 551 490 | 3/1985 |
| GB | 2 045 699 | 11/1980 |
| JP | 53-13725 | 2/1978 |
| JP | 53-2822 A | 12/1978 |
| JP | 54-96781 | 7/1979 |
| JP | 05-058221 | 3/1993 |
| JP | 07-257281 | 10/1995 |
| JP | 08-301015 | 11/1996 |
| JP | 10-127143 | 5/1998 |
| JP | 11-321462 | 11/1999 |

OTHER PUBLICATIONS

Office Action issued in the related Chinese Patent Application 200510084503.2; dispatched on Mar. 7, 2008, 7 pages.

* cited by examiner

*Primary Examiner* — Alvin C Chin-Shue
(74) *Attorney, Agent, or Firm* — Finnegan, Henderson, Farabow, Garrett & Dunner LLP (57) ABSTRACT

In one exemplary aspect, an access system for a moveable vehicle having a longitudinal axis is disclosed. The access system includes an access device attached to the vehicle and movable between a stowed position and an access position. A bottom end of the access device is disposed at a first horizontal distance from the longitudinal axis in the stowed position and is disposed a second greater horizontal distance from the longitudinal axis in the access position. The access system also includes a biasing device associated with the access device and configured to apply a continuous biasing force to bias the access device toward the access position. An actuator device is associated with the access device and configured to apply a selective actuating force to the access device.

36 Claims, 7 Drawing Sheets

ACCESS SYSTEM FOR A MOVEABLE VEHICLE

This application claims priority to and the benefit of the filing date of U.S. Provisional Application No. 60/587,879, filed Jul. 15, 2004.

TECHNICAL FIELD

This disclosure is directed to an access system. More particularly, this disclosure is directed to a powered access system for a moveable vehicle.

BACKGROUND

Some large work machines include elevated cabs accessible only by an access system, such as a stairway or a ladder. Some of these ladders are disposed vertically on the side of the work machine. A vertical ladder only slightly increases the overall footprint of the work machine, and can be secured in a location not susceptible to contact with obstacles, such as piles of materials, mine walls, or other obstacles. However, vertical ladders also have some drawbacks if used improperly. For example, some operators may not grip the ladder with both hands when ascending or descending because they may carry objects up and down the ladder. In addition, many work machines have a door to an operator's cab at the top of the vertical ladder. In such a situation, the operator may be required to balance himself on the vertical ladder, while reaching for the door handle. Furthermore, some doors swing outwardly over the ladder. In these instances, the operator may be required to move his body on the ladder out of the path of the door when opening the door. This can be difficult to do while holding onto the vertical ladder.

To make this easier, other work machines include inclined ladders or stairs extending from the work machine toward the ground. The inclined ladders and stairs generally do not require that the operator use both hands to balance himself. Accordingly, inclined ladders and stairs increase the stability of the operator when ascending or descending, providing easier access to the operator's cab. However, like vertical ladders, inclined ladders and stairs have some drawbacks. For example, inclined ladders or stairs typically extend away from the body of the work machine, increasing the overall footprint of the work machine. Accordingly, the inclined ladder and stairs are more susceptible to crashing into objects, walls, and materials and becoming damaged.

One system for providing a stairway for an on-highway truck is disclosed in U.S. Pat. No. 6,264,222 to Johnston et al. The '222 patent discloses a retractable stairway assembly that is pivoted between a deployed and a stowed position. The retractable stairway rotates about the pivot point in a horizontal direction from a location below the vehicle cab to a position on the exterior of the vehicle cab. However, the system in the '222 patent is not self contained, not easily retrofit to existing machines, and may require additional control in order to operate the stairway assembly.

The access system disclosed herein overcomes one or more of the shortcomings found in systems in the prior art.

SUMMARY OF THE INVENTION

In one exemplary aspect, an access system for a moveable vehicle having a longitudinal axis is disclosed. The access system includes an access device attached to the vehicle and movable between a stowed position and an access position. A bottom end of the access device is disposed at a first horizontal distance from the longitudinal axis in the stowed position and is disposed a second greater horizontal distance from the longitudinal axis in the access position. The access device is configured to provide access to the moveable vehicle when in the access position. The access system also includes a biasing device associated with the access device and configured to apply a continuous biasing force to bias the access device toward the access position. An actuator device is associated with the access device and configured to apply a selective actuating force to the access device. The actuating force is controllable to be greater than the biasing force to move the access device to the stowed position and controllable to be less than the biasing force to allow the biasing force to move the access device to the access position.

In another aspect, an access system for a moveable vehicle having a longitudinal axis is disclosed. The access system includes a ladder including first and second posts attached to the moveable vehicle and pivotable between a stowed position and an access position. A bottom end of the ladder is disposed at a first horizontal distance from the longitudinal axis in the stowed position and is disposed a second greater horizontal distance from the longitudinal axis in the access position. At least one of a biasing device and an actuator device is disposed in at least one of the first and second posts. The at least one of the biasing device and the actuator device is configured to move the ladder to at least one of the stowed and access positions.

DETAILED DESCRIPTION

Reference will now be made in detail to exemplary embodiments that are illustrated in the accompanying drawings. Wherever possible, the same reference numbers will be used throughout the drawings to refer to the same or like parts.

Figure 1:
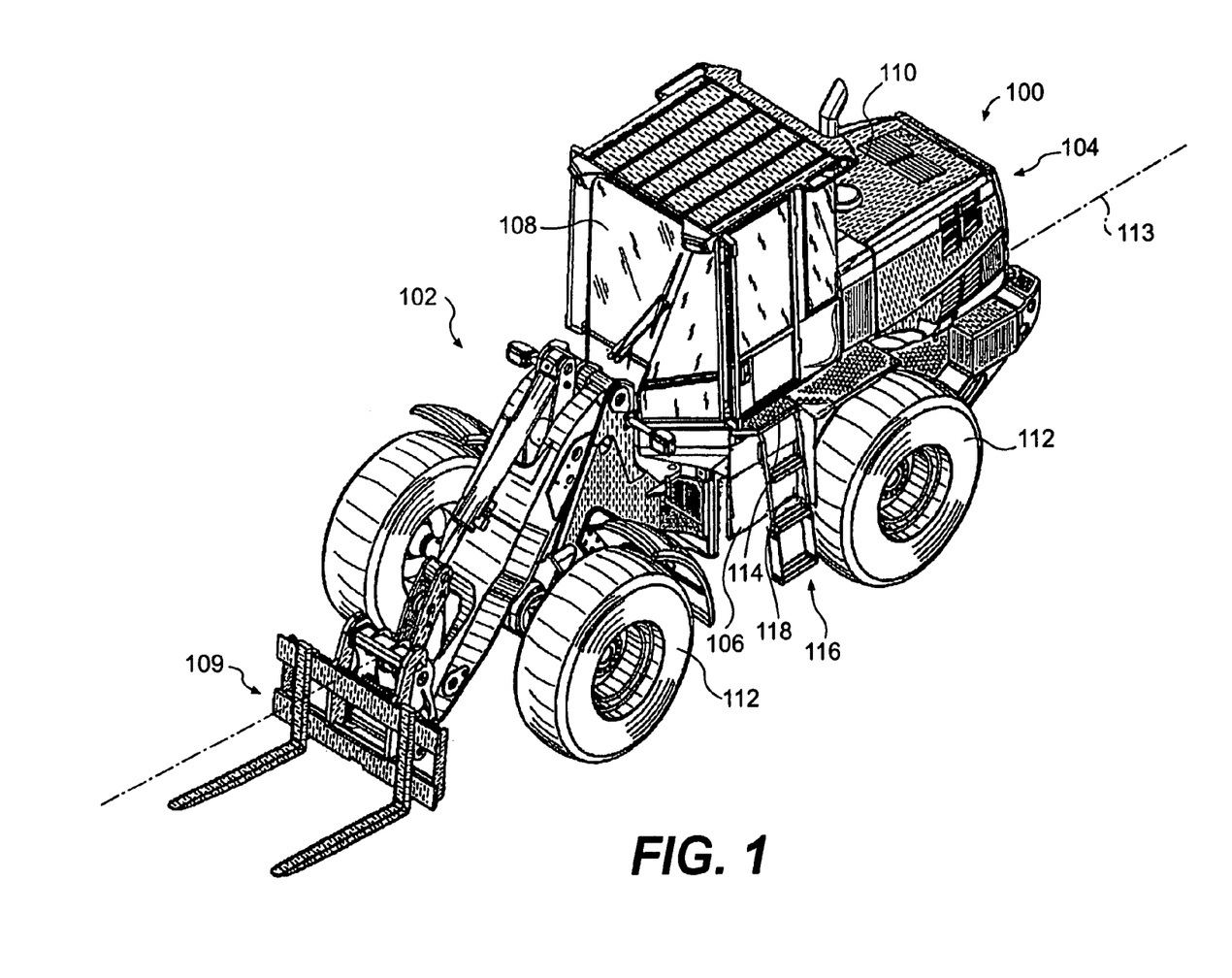
FIG. 1 is a pictorial representation of an exemplary work machine with an access system according to the present disclosure.

An exemplary embodiment of a moveable vehicle is illustrated in FIG. 1. In this embodiment, the vehicle is a work machine 100 including a front end 102, a rear end 104, a frame 106, and an operator's station, such as the enclosed operator's cab 108. The front end 102 may include a work implement 109, such as the forks in FIG. 1. It may include any other work implement, or alternatively, may not include any work implement. The rear end 104 may include an engine compartment 110 that may house an engine, a transmission, and/or other components used to power the work machine 100. The engine may drive one or more ground engaging drive mechanisms, such as the wheels 112, attached to and supporting the frame 106 in a manner known in the art.

The frame 106 is configured to provide structural support and integrity to the work machine 100. As used herein, the frame 106 may refer to any component that is generally secured in a fixed position on the work machine 100.

The operator's station may be the enclosed operator's cab 108 and may be supported on the frame 106. The operator's station could also be open and may comprise any location on where an operator can operate the work machine 100. The operator's station may include controls for operating and driving the work machine 100. One such control may include a parking brake lever operable to engage and disengage a parking brake to inhibit or not inhibit movement of the wheels 112.

The work machine 100 includes a longitudinal axis, such as, for example a longitudinal centerline 113, extending from the front end 102 to the rear end 104 of the work machine 100. Various components of the work machine 100 may be spaced a horizontal distance from the longitudinal centerline 113. For example, the wheels 112 project a given distance laterally from the longitudinal centerline 113 in a symmetrical fashion.

The work machine 100 also includes a platform 114 and an access system 116. The platform 114 may be adjacent the operator's cab 108 and, in one embodiment, is a step or floor that can be walked on when entering the operator's cab 108. The access system 116 may extend from the platform 114, providing access to the platform 114 and/or the operator's cab 108. The access system 116 includes an access device 118 articulatable from a stowed position, such as a substantially vertical position, to an access position, such as an inclined position.

Figure 2:
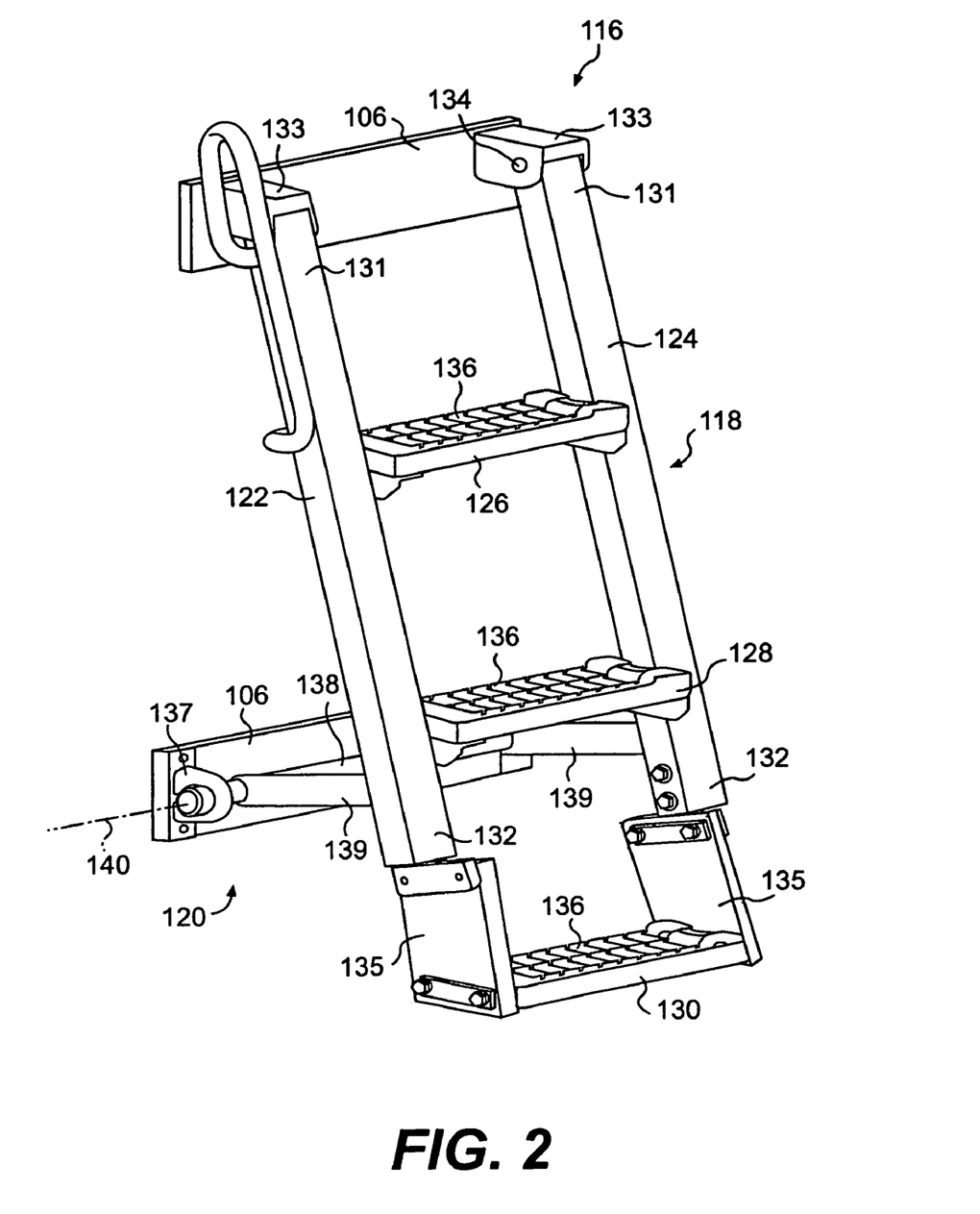
FIG. 2 is a pictorial representation of an exemplary access system.

FIG. 2 shows the exemplary access system 116 in greater detail. In FIG. 2, the access system 116 is shown in the access position. The access system 116 includes the access device 118 and an articulation system 120. In the exemplary embodiment shown, the access device 118 is a ladder, but could be any other type of device that provides access to the platform 114 and/or the operator's cab 108. The exemplary access device 118 includes first and second posts 122, 124, and first, second, and third steps 126, 128, 130.

The first post 122 and the second post 124 may be rigid linear structures, each having a top end 131 and a bottom end 132. The first and second posts 122, 124 may be hollow posts capable of housing actuators and/or springs, as will be described below. The top ends 131 may connect to pivot supports 133 by pivot pins 134. The pivot supports 133 are rigidly fixed to the frame 106 and/or platform 114 of the work machine 100. Accordingly, the access device 118 is suspended from the pivot supports 133, and may articulate about the pivot pins 134 from the stowed position, such as a substantially vertical position, to the access position shown in FIG. 2, which is an inclined position.

The first and second steps 126, 128 extend between and are attached to the first and second posts 122, 124 in a manner known in the art. The third step 130 may be suspended from the posts 122, 124 by pliable supports 135. The pliable supports 135 connect to the bottom ends 132 of the posts 122, 124 and may be formed of a rubber material or other material configured to plastically deform in the event that the pliable supports 135 or the third step 130 come into contact with an obstacle. In the embodiment shown, each step 126, 128, 130 includes a flat stepping surface 136. When the access device 118 is in the access position, the flat stepping surfaces 136 are substantially horizontal relative to the ground surface, creating steps. However, when the access device 118 is in the stowed position, the flat stepping surfaces 136 may not be substantially horizontal.

The articulation system 120 may include journal bearings 137, a rotatable shaft 138, and articulation bars 139. The journal bearings 137 may be rigidly connected to a fixed structure on the work machine 100, such as the frame 106. The rotatable shaft 138 may extend between two journaled bearings 137 (only one can be seen in FIG. 2) and may be rotatable within the journal bearings 137 about an axis 140. The articulation bars 139 may extend from the rotatable shaft 138 to the first and second posts 122, 124.

Figure 3:
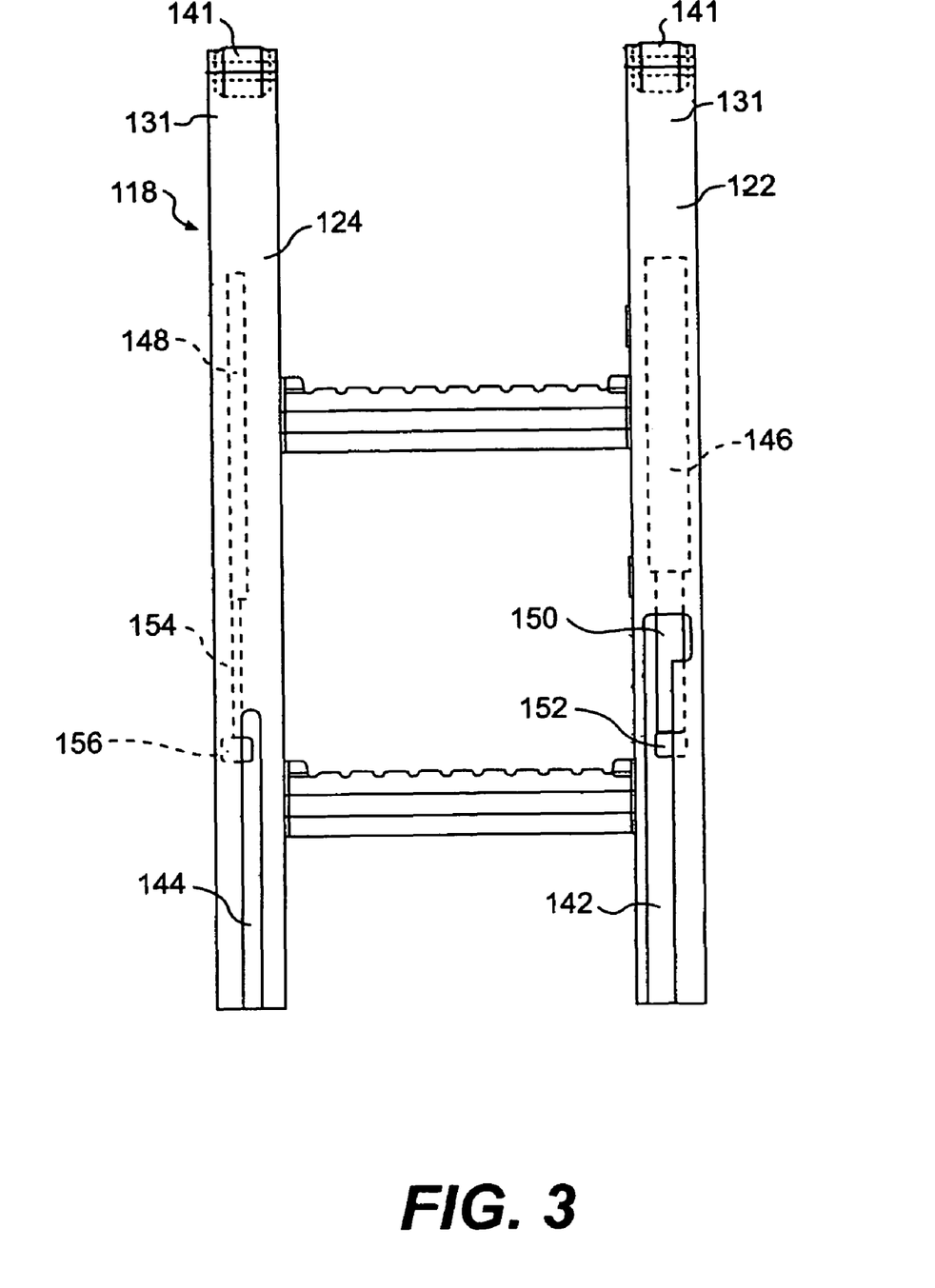
FIG. 3 is a pictorial representation of a back view of the exemplary access system of FIG. 2.

FIG. 3 shows a rear view of the access device 118, without the third step 130. As seen in FIG. 3, the access device 118 may include bearings 141, an actuator slot 142, and a spring slot 144. In addition, the access device 118 may include an actuator 146 and a biasing member, such as a gas spring 148, housed within the first and second posts 122, 124, respectively. The bearings 141 may be disposed at the top ends 131 of each of the first and second posts 122, 124 and may receive the pivot pins 134 (FIG. 2) to connect to the pivot supports 133 (FIG. 2). The bearings 141 may be lubricated bushings or other bearings known in the art.

The actuator slot 142 and the spring slot 144 each provide access to the actuator 146 and the spring 148 housed within the first and second posts 122, 124, respectively. The actuator and spring slots 142, 144 may have a width that is established such that the articulation bars 139 of the articulation system 120 can extend into the slots 142, 144 and connect to the actuator 146 and the spring 148.

The actuator 146 includes an actuator shaft 150 and may be a hydraulic actuator, a pneumatic actuator, an electrically powered motor, or other actuator known in the art, and may be secured within the post in any known manner. The actuator shaft 150 of the actuator 146 may extend and retract so that an end 152 of the actuator shaft 150, which is connected to one of the actuator bars 139, moves along the actuator slot 142, driving the actuator bars 139. It should be noted that the actuator 146 is configured so that fluid pressure causes the actuator shaft 150 to retract, moving the access device 118 to the stowed position.

The spring 148 may be a gas spring, as is shown, or other spring known in the art. The spring 148 is housed within the second post 124, and includes a spring shaft 154 extendable from the spring 148, such that an end 156 of the shaft 152, which is connected to one of the articulation bars 139, may move along the spring slot 144, driving the actuator bars. The spring 148 may be secured within the second post 124 in any known manner. The spring 148 is biased toward an extended position, providing a continuous spring force and, which is explained further below, biases the access device 118 toward the access position.

In one exemplary embodiment, the biasing member is an actual mechanical spring. In another exemplary embodiment, a biasing member such as a pneumatic or hydraulic actuator capable of moving an actuator shaft may be utilized. It is contemplated that other biasing means known to those skilled in the art may also be used.

Figure 4A:
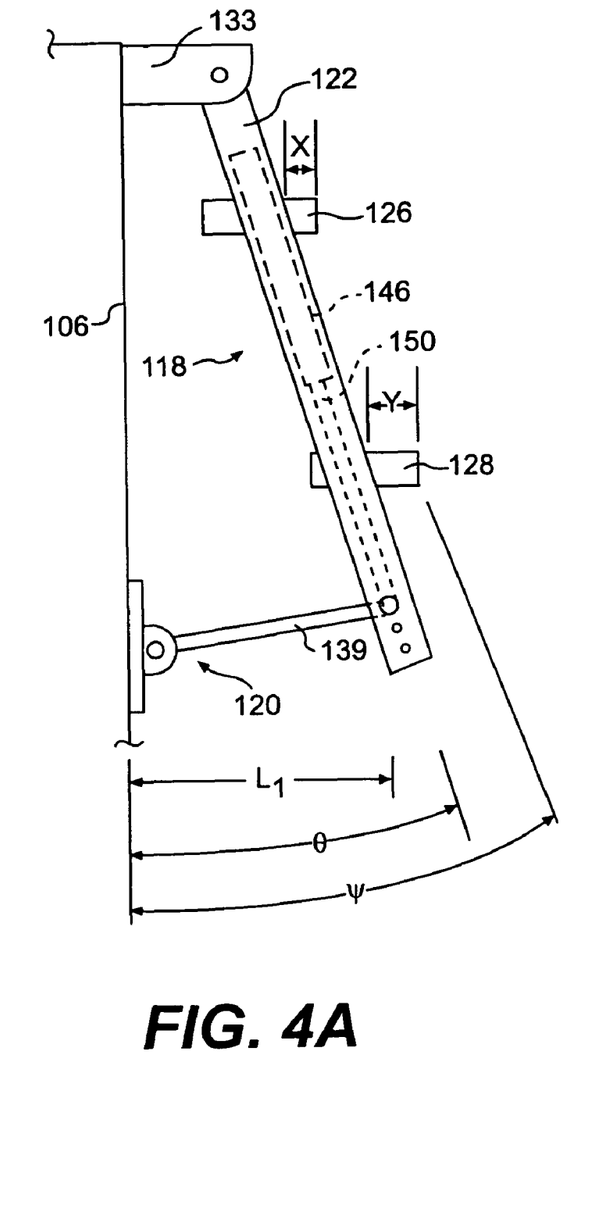
FIGS. 4A and 4B are pictorial representations of the exemplary access system of FIG. 2 in an access and a stowed position.
Figure 4B:
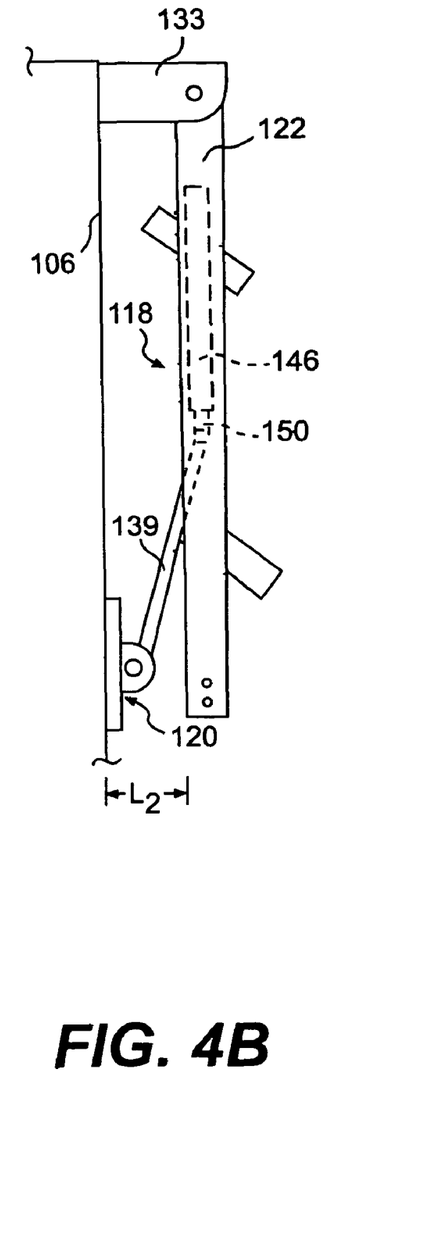

FIGS. 4A and 4B show the access system 116 in an access position and a stowed position, respectively, without the third step 130. As shown in FIG. 4A, in the access position, the access device 118 is in an inclined position. As shown in FIG. 4B, in the stowed position, the access device 118 is in a substantially vertical position relative to the frame 106.

In the exemplary embodiment shown in FIG. 4A, the actuator shaft 150 of the actuator 146 in the first post 122 is extended to a position where the articulation bar 139 is generally perpendicular to the access device 118. Accordingly, the weight of the an operator on access device 118 will be supported by the pivot supports 133 and the articulation system 120, rather than the actuator 146 or the spring 148 (not shown in FIG. 4). However, the articulation bar 139 could be at angles other than generally perpendicular. As shown in FIG. 4B, when the actuator shaft 150 is in a retracted position, the angle between the articulation bar 139 and the first post 122 decreases, pulling the access device 118 into the stowed position.

As shown in FIGS. 4A and 4B, a bottom end of the access device 118 is spaced from the frame 106 by a distance L1 in the access position and a distance L2 in the stowed position. The distance L1 in the access position is greater than the distance L2. In FIGS. 4A and 4B, the distances L1 and L2 are shown as the distance between a bottom end of the access device 118 and the frame 106. However, the distance may also be measured from the longitudinal centerline 113 of the work machine 100. The ground engaging drive mechanisms, such as the wheels 112 (shown in FIG. 1), may be spaced from the longitudinal centerline by a third distance that is greater than the distance L2, but less than the distance L1. Accordingly, when the access device 118 is in the stowed position, shown in FIG. 4B, the access device 118 is protected by the wheels 112. When the access device 118 is in the access position, the access device 118 may extend further from the centerline than the wheels 112.

The first and second posts 122, 124 define a post angle θ that may vary between the access position and the stowed position. In one exemplary embodiment, when in the access position, the post angle θ is about 15 degrees. The post angle could be set to other angles when in the access position as would be apparent to one skilled in the art.

The first and second steps 126, 128 may form a step angle. As shown in FIG. 4A, a step angle Ψ is defined by the angle between the frame 106 and a line passing through the front edge of the first and second steps 126, 128. The step angle Ψ may be the same as the post angle θ, or may be a different angle. In the embodiment shown, the step angle Ψ is greater than the post angle θ. This is because the first and second steps 126, 128 are off-set different distances from the posts 122, 124. As shown in FIG. 4A, the first step 126 is disposed so that a front end of the first step 128 is spaced or off-set from the post 122 by a distance X. The second step 128 is disposed so that a front end of the second step is spaced or offset from the post 122 by a distance Y. In FIG. 4A, the distance Y is greater than the distance X. Accordingly, the step angle Ψ is greater than the post angle θ. Thus, the steps are less steep than the posts 122, 124, simplifying the climbing of the access device, without the access device extending further from the work machine.

Figure 5:
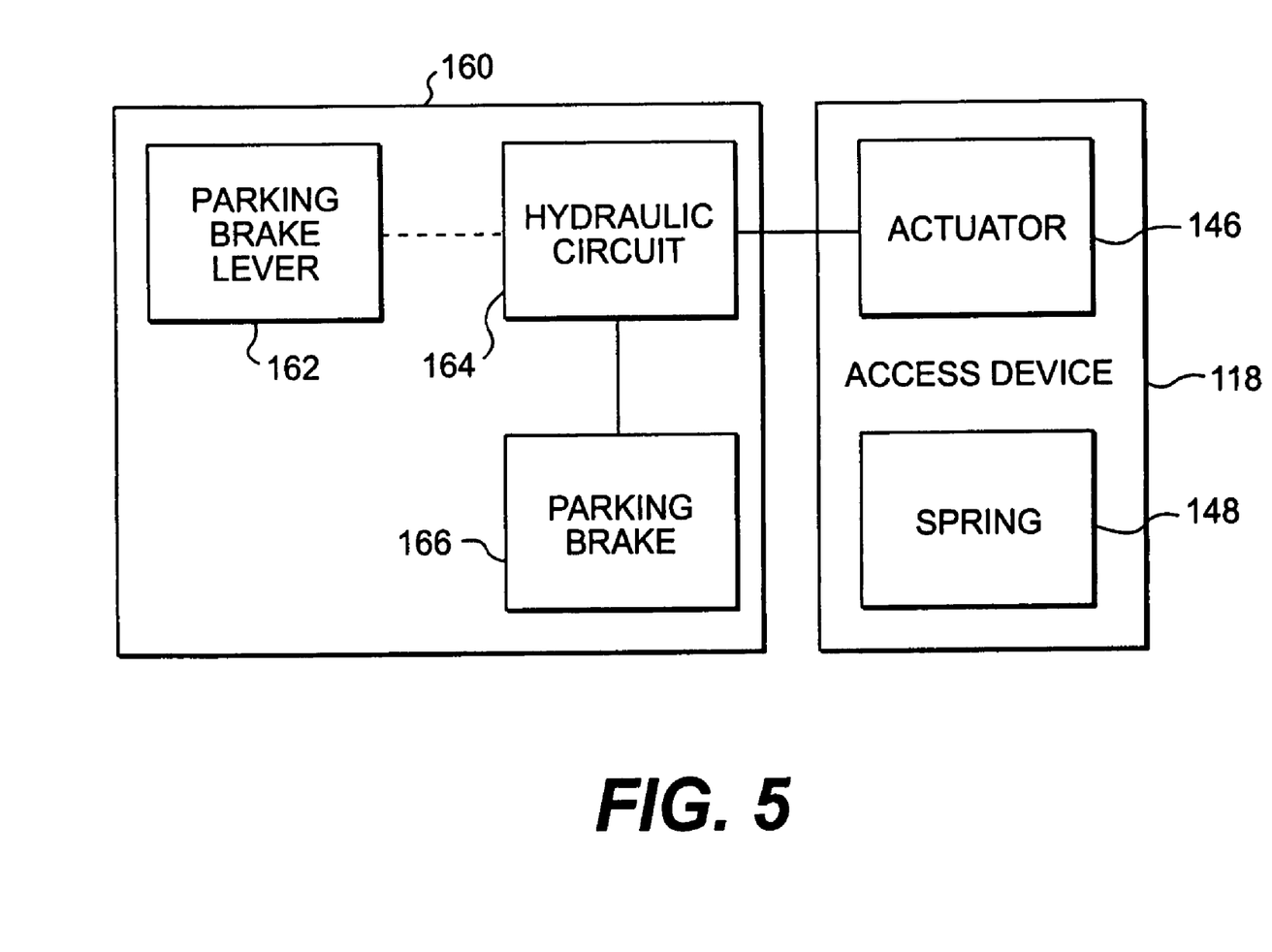
FIG. 5 is a block diagram of an exemplary parking brake mechanism and an associated access system.

FIG. 5 is a block diagram of a parking brake mechanism 160 and the access device 118 for the work machine 100. The parking brake mechanism 160 includes a parking brake lever 162, a hydraulic circuit 164, and a parking brake 166. The parking brake lever 162 may be disposed within in the operator's cab 108 for use by an operator and represents a lever, button, pedal, or other means for signaling a desired activation of the parking brake 166. The parking brake lever may be configured to control a fluid pressure in the hydraulic circuit 164. The pressure in the hydraulic circuit 164 engages the parking brake or allows the parking brake to be disengaged. When the parking brake 166 is engaged, the movement of the wheels 112 is inhibited, and when the parking brake 166 is not engaged, the movement of the wheels 112 is not inhibited.

In this embodiment, the parking brake 166 is configured to be engaged when the hydraulic circuit 164 has a low pressure or a pressure below a threshold, including zero pressure. Therefore, to disengage the parking brake 166 with the parking brake lever 162, the work machine 100 must pressurize the hydraulic circuit 164. It should be noted that if the hydraulic circuit 164 loses pressure during operation, the parking brake 166 becomes engaged.

The access device 118 is associated with parking brake mechanism 160 through a connection between the actuator 146 and the hydraulic circuit 164. Therefore, when the hydraulic circuit 164 is at a high pressure or above a threshold, and the parking brake is disengaged, the actuator 146 is retracted, holding the access device 118 in the stowed position. When the hydraulic circuit is at a low pressure, the parking brake engages and the spring 148 urges the articulation bars 139, moving the access device 118 to the access position. Accordingly, the access device 118 is in the access position when pressure in the hydraulic circuit 164 is low and in the stowed position when the pressure in the hydraulic circuit 164 is high.

The speed that the access device 118 moves between the stowed and access positions may be regulated, if desired, by controlling the flow rate of fluid from the parking brake hydraulic circuit 164 to the actuator 146. In one exemplary embodiment, this is accomplished by including a pre-sized orifice in a hydraulic line of the hydraulic circuit 164, to reduce the flow rate of fluid to the circuit. In one exemplary embodiment, a 0.8 mm orifice may be used to achieve the desired speed. Other methods and systems for controlling the flow rate of fluid may also be used.

Figure 6A:
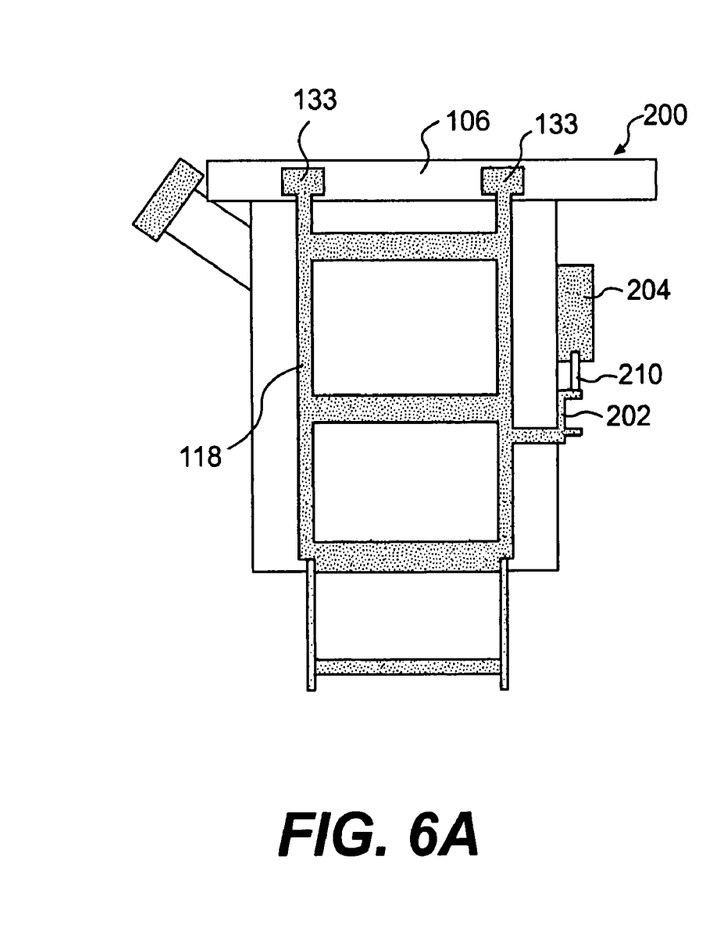
FIGS. 6A, 6B, 7A, and 7B are pictorial representations showing another exemplary embodiment of an access system according to the present disclosure.
Figure 6B:
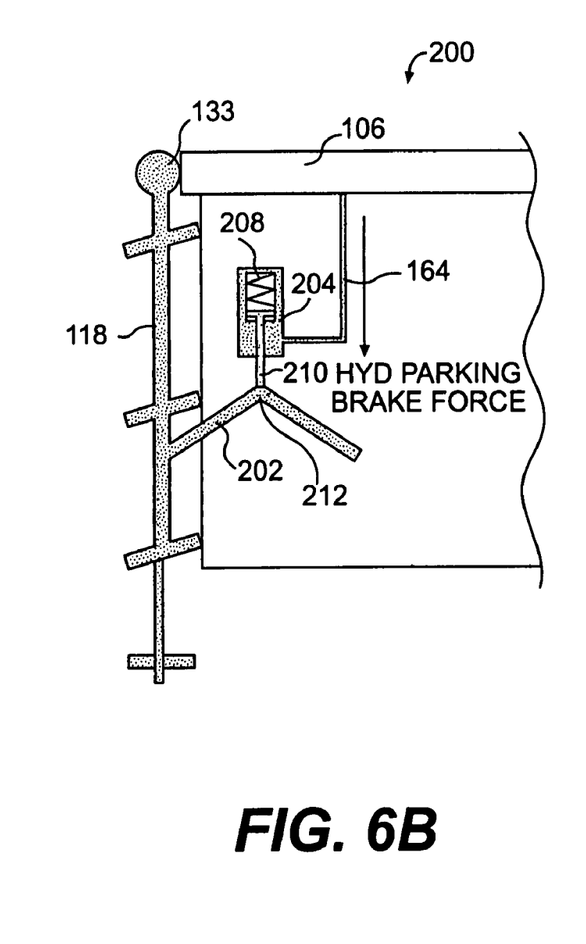
Figure 7A:
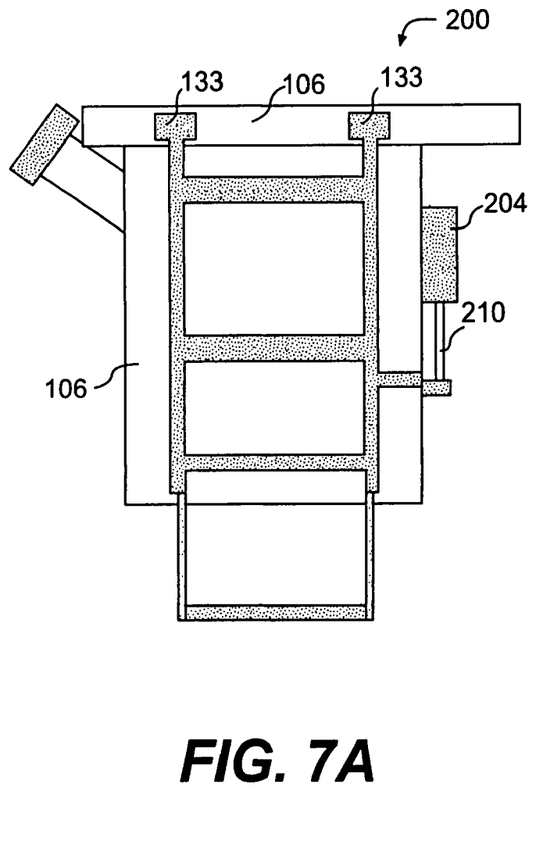
Figure 7B:
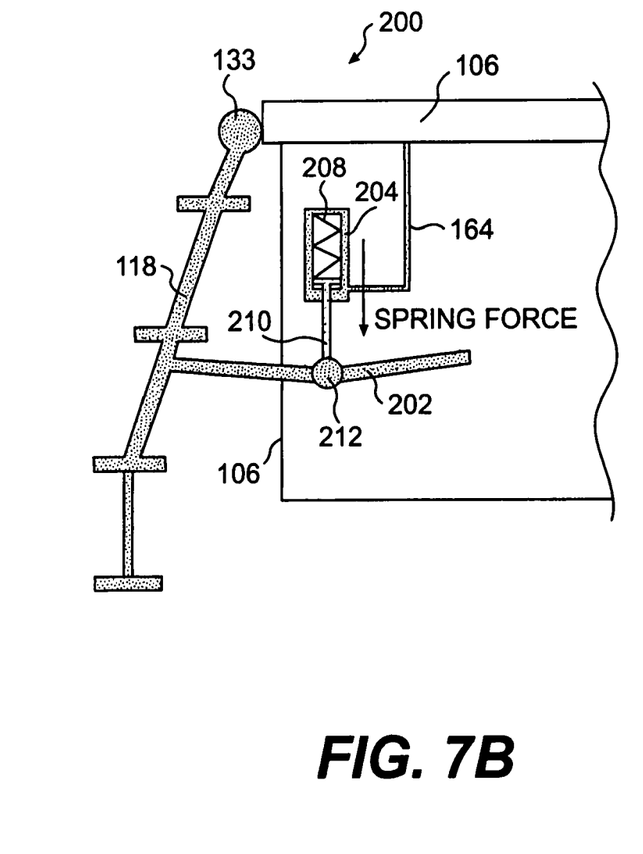

FIGS. 6A, 6B, 7A, and 7B show an additional embodiment of an access system 200 for moving the access device 118 to a stowed and an access position. FIGS. 6A and 6B show the access device 118 in a stowed position, and FIGS. 7A and 7B show the access device 118 in an access position. FIGS. 6A and 7A are front views and FIGS. 6B and 7B are side views of the access system 200. The access system 200 includes the access device 118, an articulation bar 202, and a spring loaded actuator 204.

With reference to FIGS. 6A, 6B, 7A, and 7B, the articulation bar 202 is disposed on the frame 106 of the work machine 100 adjacent the access device 118. It connects to a post of the access device 118 and to the spring loaded actuator 204 at a pivot point 212.

The spring loaded actuator 204 includes a spring 208 and an actuator shaft 210. A parking brake hydraulic circuit 164 is in fluid communication with the spring loaded actuator 204. The spring 208 biases the actuator shaft 210 toward an extended position. However, the fluid pressure from the hydraulic circuit 164 may increase and overcome the spring force, causing the actuator shaft 210 to retract. When the actuator shaft 210 is retracted, the access device 118 is in the stowed position shown in FIGS. 6A and 6B. When the actuator shaft 210 is extended, the access device 118 is in the access position shown in FIGS. 7A and 7B.

Although the embodiment in FIG. 3 shows a spring and an actuator in separate posts, it would be apparent to one skilled in the art that a spring loaded actuator, such as the actuator shown in FIGS. 6A and 6B, could be used in one post or both posts of the ladder 118. Other arrangements of the various components are also possible.

INDUSTRIAL APPLICABILITY

The access system disclosed herein may move the access device 118 to an access position when the parking brake 166 is engaged and to a stowed position when the parking brake 166 is not engaged. The access position may be an inclined position that allows an operator to more easily ascend or descend the access device 118 from a platform 114 or operator's cab 108. The stowed position may be a substantially vertical position so that the access device 118 is less susceptible to contact with and damage from obstacles.

It should be noted, in the absence of sufficient fluid pressure, the parking brake 166 engages. Only when the fluid pressure is sufficiently high, will the parking brake 166 disengage. It should also be noted that a biasing device, such as the spring 148, 208, may continuously apply a spring force to bias the access device 118 to the access position. Therefore, in the absence of sufficient fluid pressure, the spring force pushes the articulation bars 139, 202 to move the access device 118 to the access position. Only when the fluid pressure is sufficiently high, will the actuator 146, 204 generate an actuating force that overcomes the spring force, retracting the actuator shaft 150, 210 to move the access device 118 to the stowed position.

A method for operating the access system will now be described.

An operator in the operator station 108 may desire to descend from the work machine 100. Accordingly, the operator stops the work machine 100 and actuates a parking brake controller in the operator's cab 108, such as the parking brake lever 162. The parking brake lever 162 signals to reduce the fluid pressure in the parking brake hydraulic circuit 164, thereby allowing the parking brake 166 to engage, hindering movement of the wheels 112.

As the fluid pressure in the hydraulic circuit 164 decreases, the actuator force holding the actuator shaft 150, 210 in a retracted position decreases. When the actuator force decreases to a level less than the spring force of the springs 148, 208, the springs 148, 208 move the articulation bar 139, 202 downward, forcing the access device 118 to pivot at the pivot support 133 and move to the access position.

When the operator again desires to drive the work machine 100, the operator controls the parking brake lever 162 to generate a signal to increase the pressure in the hydraulic circuit 164 to disengage the parking brake 166. When the pressure in the hydraulic circuit 164 increases, the fluid generates an actuator force in the actuator 146, 204. When the actuator force is greater than the spring force, the actuator 146, 204 retracts, compressing the spring 148, 208 and raising the articulation bar 139, 202, and moving the access device 118 to a stowed position.

In such a system, if the hydraulic circuit 164 loses pressure intentionally or unintentionally, the parking brake engages and the access device 118 is moved to an inclined position allowing the operator to descend from the work machine 100. This is because the access device 116 is continuously biased toward the access position.

Because the access system 116 is associated with and controlled by the hydraulic circuit 164 of the parking brake mechanism 160, the access system 116 may be easily retrofit onto existing work machines. To retrofit the access system 116, the access system must be fixedly secured to the frame of the work machine and the hydraulic actuator may be integrated into the existing hydraulic circuit.

Although the exemplary moveable vehicle disclosed herein is a work machine 100, and more particularly, a wheel loader, the access system 116 could be used on other moveable vehicles, such as, for example, a motor grader, an off-highway truck, and an on-highway truck, among others.

It will be apparent to those skilled in the art that various modifications and variations can be made in the disclosed embodiments without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. An access system for a moveable vehicle having a longitudinal axis, comprising:
    an access device attached to the vehicle and movable between a stowed position and an access position, wherein a bottom end of the access device is disposed at a first horizontal distance from the longitudinal axis in the stowed position and is disposed a second greater horizontal distance from the longitudinal axis in the access position, the access device being configured to provide access to the moveable vehicle when in the access position;
    a biasing device associated with the access device and configured to apply a continuous biasing force to bias the access device toward the access position;
    an actuator device associated with the access device and configured to apply a selective actuating force to the access device, the actuating force being controllable to be greater than the biasing force to move the access device to the stowed position and controllable to be less than the biasing force to allow the biasing force to move the access device to the access position; and
    a parking brake mechanism including a parking brake and a hydraulic circuit, the parking brake mechanism being configured to selectively engage and disengage the parking brake, wherein the parking brake is engaged when the hydraulic circuit is at a first pressure and disengaged when the hydraulic circuit is at a second higher pressure;
    wherein the hydraulic circuit is associated with the actuator device to generate the actuating force, and wherein the actuating force at the first pressure is less than the biasing force and wherein the actuating force at the second higher pressure is greater than the biasing force, such that the access device is in the access position when the parking brake is engaged and in the stowed position when the parking brake is disengaged.

2. The access system of claim 1, wherein the access device is a ladder pivotal about a pivot point at an end of the ladder.

3. The access system of claim 2, wherein the ladder includes first and second posts, at least one of the biasing device and the actuator device being disposed within at least one of the first and second posts.

4. The access system of claim 3, including an articulation bar attached by a pivot to the vehicle, wherein at least one of the first and second posts includes a slot formed therein, at least a portion of the at least one of the biasing device and the actuator device in the post being accessible through the slot, and wherein the articulation bar extends into the slot and connects to the at least one of the biasing device and the actuator device in the post.

5. The access system of claim 4, wherein the articulation bar is disposed to pivot relative to the vehicle to move the ladder between the stowed position and the access position.

6. The access system of claim 2, wherein the ladder includes steps having a substantially flat stepping surface, the stepping surface being substantially horizontal relative to the vehicle when the ladder is in the access position.

7. The access system of claim 2, wherein the ladder includes first and second posts defining a post angle between the posts and the vehicle; and
    at least two steps extending between and connected to the first and second posts, the at least two steps each having a front edge, wherein a step angle is defined between the vehicle and a line passing through the front edge of the steps, wherein the step angle is different than the post angle when the access device is in the access position.

8. The access system of claim 7, wherein at least one step is offset from the first and second posts a distance greater than an offset distance of another step.

9. The access system of claim 1, wherein the biasing device is a gas spring.

10. The access system of claim 1, wherein the biasing device is a spring disposed within the actuator device.

11. The access system of claim 1, wherein at least one of the biasing device and the actuator device is within the access device.

12. The access system of claim 1, wherein at least one of the biasing device and the actuator device is disposed at a location adjacent the access device.

13. The access system of claim 12, including a linkage extending between the access device and the at least one of the biasing device and the actuator device disposed adjacent the access device.

14. The access system of claim 1, wherein the stowed position is a substantially vertical position.

15. The access system of claim 1, including an articulation bar attached by a pivot to the vehicle, the articulation bar extending to the access device.

16. The access system of claim 1, wherein the access device is configured to only pivot about a single axis.

17. The access system of claim 2, wherein the ladder is retained in the stowed position by fluid pressure throughout movement of the vehicle.

18. The access system of claim 13, further including an additional step flexibly connected to a distal end of the ladder.

19. The access system of claim 18, wherein the linkage is connected to the access device at a location between the additional step and a pivot end of the access device.

20. An access system for a moveable vehicle, comprising:
a ladder having first and second posts and a plurality of steps connected between the first and second posts, the first and second posts being pivotally attached to the vehicle at a first end to move between a stowed position and an access position;
a biasing device attached to the first and second posts to apply a continuous biasing force to the ladder;
a hydraulic actuator device connected between the vehicle and the first and second posts to move the ladder against the biasing force; and
a parking brake mechanism associated with a parking brake of the vehicle, the parking brake mechanism being fluidly connected to the hydraulic actuator to de-activate the hydraulic actuator when the parking brake is activated.

21. The access system of claim 20, wherein a distance that a distal step of the plurality of steps extends from the first and second posts is greater than a distance that a proximal step of the plurality of steps extends from the first and second posts.

22. The access system of claim 21, wherein the biasing device includes a spring that urges the ladder toward the access position.

23. The access system of claim 22, wherein the ladder is retained in the stowed position by fluid pressure throughout movement of the vehicle.

24. The access system of claim 23, further including linkage pivotally connected at a first end to the vehicle and at a second end to the ladder.

25. The access system of claim 24, wherein the biasing device is connected to move the linkage.

26. The access system of claim 25, wherein the biasing device is connected between the vehicle and the linkage.

27. The access system of claim 26, further including an additional step flexibly connected to a distal end of the ladder.

28. The access system of claim 27, wherein the linkage is connected to the ladder at a location between the additional step and the first end of the ladder.

29. The access system of claim 20, wherein the ladder is configured to only pivot about a single axis that is located at the first end of the ladder.

30. The access system of claim 20, wherein each of the plurality of steps is rigidly connected to the first and second posts.

31. An access system for a moveable vehicle, comprising:
a ladder having first and second posts and a plurality of steps connected between the first and second posts, the ladder being pivotally attached to the vehicle at only one end to move between a stowed position and an access position;
linkage connected between the vehicle and a mid-portion of the ladder;
a spring attached between the vehicle and the linkage to extend the linkage and move the ladder away from the vehicle to the access position;
a hydraulic cylinder connected between the vehicle and the ladder, the hydraulic cylinder selectively filled with pressurized fluid to retract the ladder and retain the ladder in the stowed position;
a parking brake mechanically associated with a wheel of the vehicle; and
a parking brake controller fluidly connected to the hydraulic cylinder and to the parking brake, the parking brake controller configured to selectively depressurize the parking brake and the hydraulic cylinder to cause the parking brake to inhibit wheel movement and to allow the spring to move the ladder to the access position.

32. The access system of claim 31, wherein a distance that a distal step of the plurality of steps extends from the first and second posts is greater than a distance that a proximal step of the plurality of steps extends from the first and second posts.

33. The access system of claim 32, wherein the ladder is retained in the stowed position by fluid pressure throughout movement of the vehicle.

34. The access system of claim 33, wherein the linkage includes a first link member and a second link member pivotally connected to the first link member at a link pivot point, and the hydraulic cylinder and spring are located at the link pivot point.

35. The access system of claim 34, further including an additional step flexibly connected to a distal end of the ladder.

36. The access system of claim 35, wherein the linkage is connected to the ladder at a location between the additional step and a pivot end of the ladder.

* * * * *